United States Patent [19]

Fahlen et al.

[11] 4,240,044
[45] Dec. 16, 1980

[54] PULSED LASER ELECTRODE ASSEMBLY

[75] Inventors: Theodore S. Fahlen, San Jose; David J. Clark, Whittier, both of Calif.

[73] Assignee: GTE Products Corporation, Stamford, Conn.

[21] Appl. No.: 57,927

[22] Filed: Jul. 16, 1979

[51] Int. Cl.³ .............................................. H01S 3/00
[52] U.S. Cl. ...................... 331/94.5 PE; 331/94.5 D; 331/94.5 C; 331/94.5 G
[58] Field of Search .................. 331/94.5 PE, 94.5 D, 331/94.5 C, 94.5 G

[56] References Cited

U.S. PATENT DOCUMENTS

| 3,577,096 | 5/1971 | Bridges et al. | 331/94.5 PE |
| 4,135,167 | 1/1979 | Godard | 331/94.5 PE |

Primary Examiner—William L. Sikes
Assistant Examiner—Léon Scott, Jr.
Attorney, Agent, or Firm—John F. Lawler

[57] ABSTRACT

An electrode assembly for a compact high vacuum pulsed gas discharge laser comprises an elongated cathode and a coextensive anode spaced apart in a direction transversely of the flow of gas to define a discharge gap. Each of the electrodes is connected at a plurality of equally spaced points along its length to a like number of conductive rods which extend through the top wall of the laser housing for connection to a power source. The cathode comprises a carrier bar directly attached to said rods and a cathode bar adjustably secured to the carrier bar for vertical movement toward and away from the anode to permit attainment of a uniform discharge gap throughout the length of the electrodes. Preionization of the discharge gap is achieved by means of a conductive sleeve electrically connected to one of the electrodes and disposed against the inner surface of a dielectric tube which contacts the other electrode throughout its length. A cooling tube from an external source of coolant passes through a vacuum-tight housing feedthrough post for engagement with the cathode carrier bar over its length for cooling the cathode assembly.

7 Claims, 7 Drawing Figures

PULSED LASER ELECTRODE ASSEMBLY

BACKGROUND OF THE INVENTION

This invention was made under a contract with the Department of the Air Force.

RELATED APPLICATIONS

Ser. No. 057,928 COMPACT PULSED GAS TRANSPORT LASER by Fahlen et al
Ser. No. 57,929 LASER OPTICAL RESONATOR ASSEMBLY by Fahlen et al This invention relates to lasers and more particularly to an improved electrode assembly for a gas transport laser.

The operation of a pulsed gas discharge laser at high average powers is dependent, inter alia, on the length of the discharge zone through which the laser beam passes and the uniformity of energy distribution in the discharge zone. Prior high power lasers have used an elongated anode and cathode construction to provide a discharge zone with a length designed to yield the desired power. The difficulty with such electrode structures is that variations in energy density in the discharge zone occur because of small deviations in spacing of the electrodes over their length. These energy variations adversely affect laser performance for two reasons. First, either too much or too little energy deposition in part of the discharge volume decreases the laser gain there from the optimum value due to gas heating (too much energy deposition) or not enough excitation. Reduced gain leads to reduced output power. Second, when the discharge is concentrated in a small portion of the available discharge volume, arcs are very likely to occur there due to overheating of the gas. Besides the possibility of damaging the electrodes, these arcs rob the gain-producing energy from the rest of the discharge volume.

The average power output of such a laser is also dependent on the pulse repetition frequency (PRF). In order to increase the PRF according to prior practice, a preionization electrode is disposed in or near the discharge zone and is electrically energized so as to produce an initial ion population in the gas which hastens breakdown of the gas when the main energy pulse is applied across the electrodes. The effectiveness of such preionization technique is dependent in large measure on the uniformity of ion formation over the discharge zone which in turn depends on the uniformity of spacing of the preionization electrode from the laser electrode. One technique used in the past to achieve such uniform electrode spacing is a conductive wire supported coaxially within a dielectric tube by an epoxy or the like. The tube is then supported against the laser electrode and the wire electrically connected to the other laser electrode. Such preionization structure, however, is difficult and costly to construct and also tends to contaminate gasses in the laser because of the epoxy or other substance used to support the wire in the tube.

This invention is directed to an electrode structure which overcomes these difficulties.

OBJECTS AND SUMMARY OF THE INVENTION

A general object of this invention is the provision of a laser electrode structure capable of providing a uniform discharge of high intensity over an elongated discharge gap.

A further object is the provision of an electrode structure for a pulsed gas discharge laser with an improved preionization electrode structure which insures the formation of uniformly distributed ions in the discharge gap prior to the main energy pulse across the laser electrodes.

Still another object is the provision of a laser electrode structure which is simple to maintain and to adjust for establishing a discharge gap of optimum width.

These and other objects of the invention are achieved with laser electrodes comprising elongated continuous anode and cathode structures, the latter being adjustable over the length thereof relative to the anode for establishing a uniform electrode spacing and therefore a uniform discharge gap. This structure features a two-piece cathode having a fixed carrier bar to which a cathode bar is secured for movement relative to the anode. The cathode also has a preionization electrode in the form of a conductive sleeve electrically connected to one laser electrode and disposed against the interior of a dielectric tube having uniform wall thickness and which engages the other laser electrode over its length. Uniform spacing between the sleeve and cathode bar is thus assured for generating a uniform density of ions immediately prior to the main energy pulse applied to the laser electrodes.

DESCRIPTION OF PREFERRED EMBODIMENT

Figure 1:
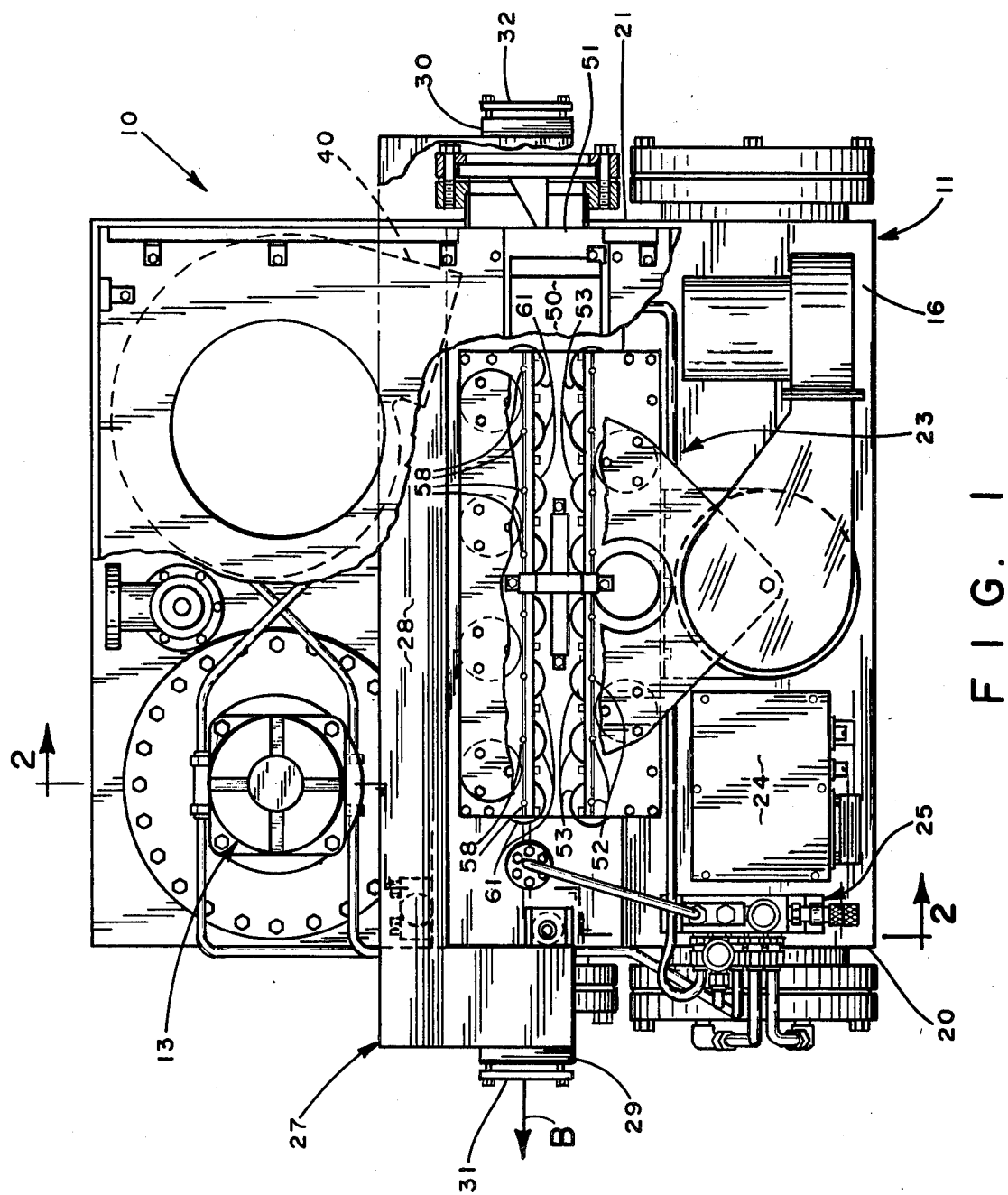
FIG. 1 is a plan view of a gas transport laser embodying this invention, part of the top wall being broken away to show details of construction.
Figure 2:
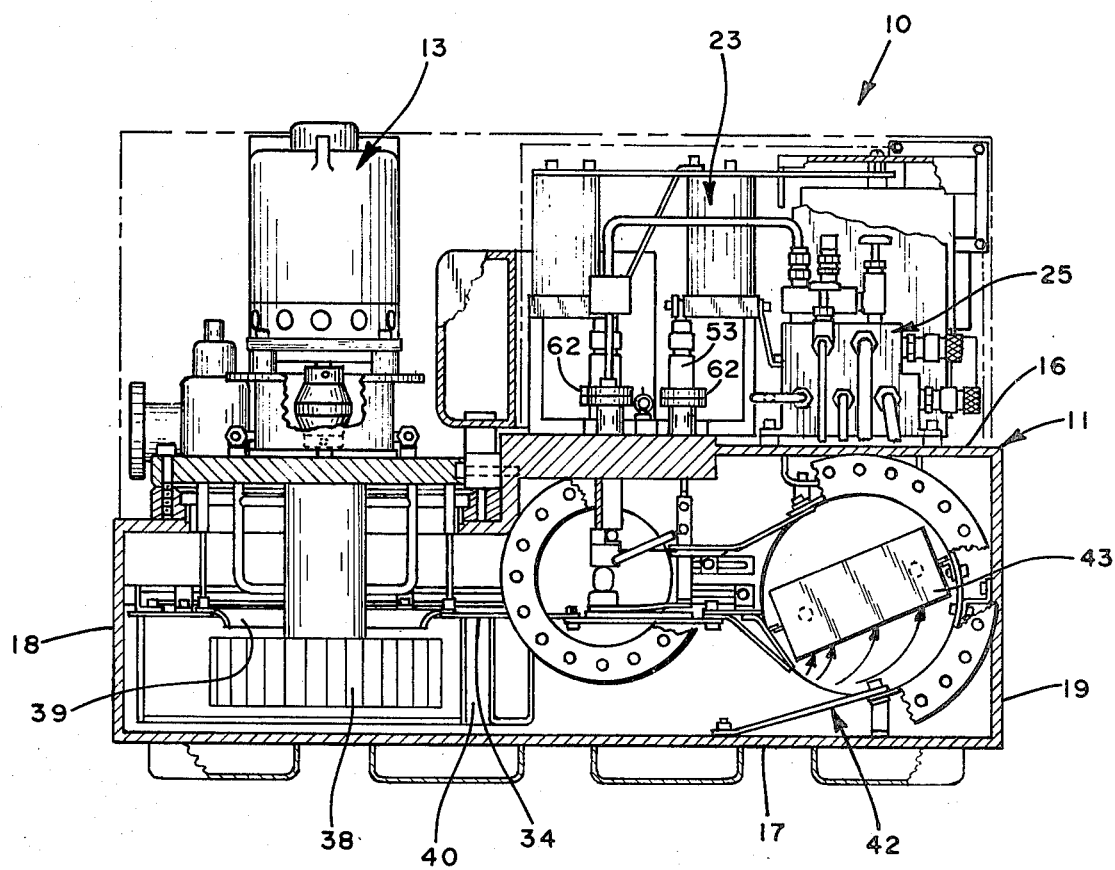
FIG. 2 is a transverse section taken on line 2—2 of FIG. 1.

Referring now to the drawings, FIGS. 1 and 2 show a gas transport laser 10 embodying the invention and comprising a hermetically sealed box-like housing 11 in which a gas, such as a xenon-helium mixture, is circulated by two motor-fan assemblies at one end of the housing, one of such assemblies being indicated at 13. The properties of xenon-helium mixture are such that as to produce a laser beam at wavelengths of 2-4 microns when used as a lasing medium. The housing preferably is made of stainless steel and comprises a top wall 16, a bottom wall 17, end walls 18 and 19, and front and rear walls 20 and 21, respectively. A pulse forming network 23 is mounted on top wall 16 and is connected to an external high voltage power supply, not shown, through a distribution box 24 for energizing the laser to produce a beam along the laser optical axis B from front wall 20.

A coolant, such as water, for the internal parts of the laser is distributed through a manifold assembly 25 connected to an outside coolant source, not shown. An optical resonator assembly 27 is also mounted on the top wall and has an elongated U-shaped bench 28 having downwardly extending legs 29 and 30 overlying front wall 20 and rear wall 21, respectively, and providing a means for adjustably mounting mirror support plates 31 and 32, respectively, which define the laser cavity. The resonator structure is described in greater detail in our copending application Ser. No. 057,929.

The interior of housing 11 is divided by a central plane partition 34 into an upper channel 35 between the partition and top wall 16 and a lower channel 36 between the partition and bottom wall 17. Each of the motor-fan assemblies has a fan 38 disposed in the lower channel below an opening 39 in partition 34 and operates to draw gas from the upper channel through opening 39 and to force it through fan casing 40 and the lower channel to the opposite end of the housing. A U-shaped flow guide 42 at the opposite end of the housing directs the circulating gas from the lower channel to move in the opposite direction in the upper channel at high velocity in a section having a reduced height. A water cooled heat exchanger 43 in flow guide 42 removes heat from the flowing gas. The laser structure is described in greater detail in our copending application Ser. No. 057,928.

Figure 3:
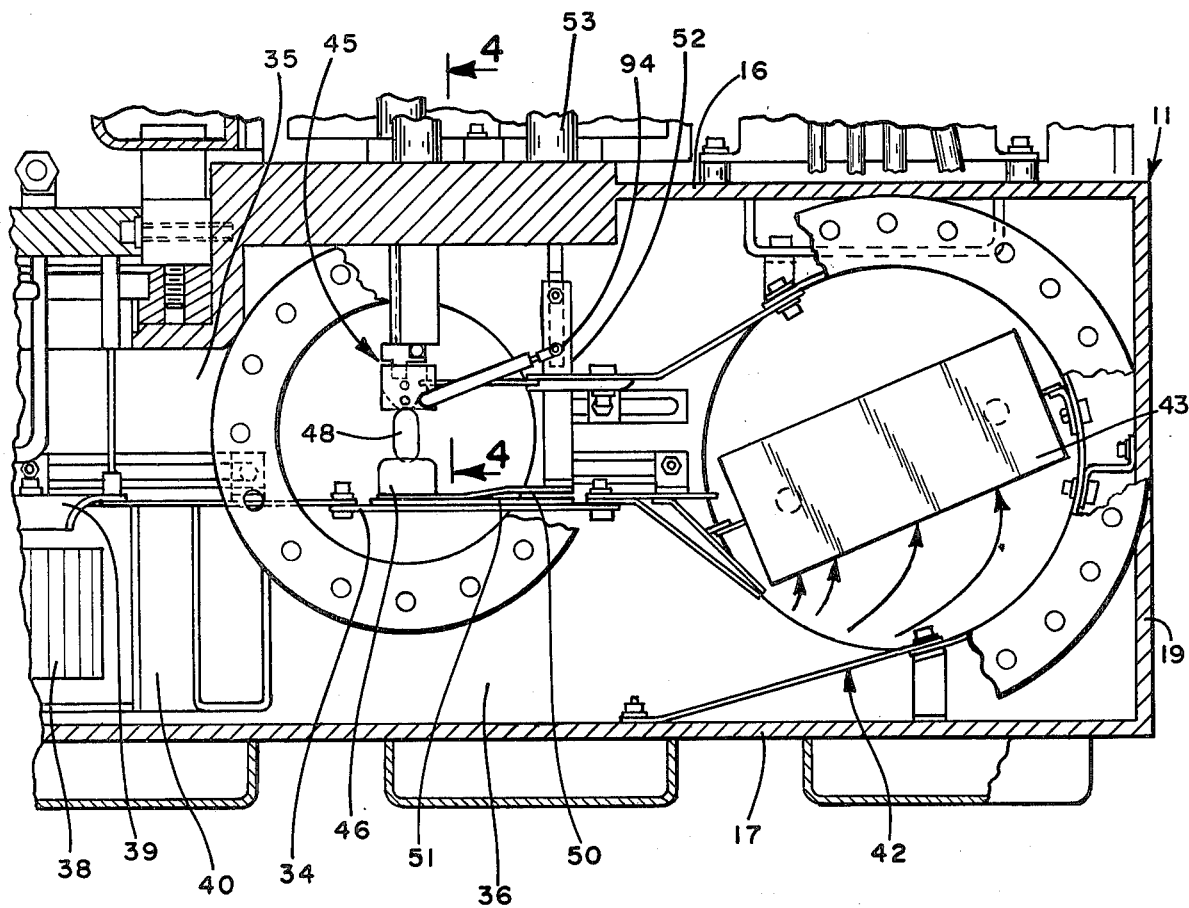
FIG. 3 is an enlarged view of part of FIG. 2 showing details of construction.

In accordance with this invention, lasing action in the gas flowing at high velocity is produced by an electrical discharge between a cathode assembly 45 and an anode 46 which extend transversely of the direction of gas flow for a substantial portion of the length of the laser, i.e., between the front and rear walls 20 and 21, respectively. The laser beam is generated by this discharge and is resonated by mirrors mounted externally of the housing on support plates 31 and 32 after passing through Brewster windows sealed in the front and rear housing walls, one of which window aperture is shown at 48 in FIG. 3. The power of the output laser beam is dependent in part on the length of the laser discharge zone and accordingly cathode assembly 45 and anode 46 are elongated, i.e., approximately ⅔ of the length of the laser housing. In order to insure maximum efficiency of operation and an output beam of high quality, the electrical discharge in the flowing gas must have a high degree of uniformity over the length of the laser electrodes and this depends in large measure on the uniformity of the spacing of the laser electrodes.

Anode 46 is a solid bar preferably made of aluminum and having a generally rectangular cross section. Anode 46 is attached to a continuous conductive sheet 50 of copper or the like supported by an insulator slab or layer 51, such as Pyrex glass or alumina, by partition 34. Sheet 50 is electrically connected to a plurality of vertically extending conductive posts, one of which is indicated at 52 in FIG. 3, which extend through and are sealed to housing top wall 16 by feedthrough tubes 53 for connection to pulse forming network 23. The several posts 52 are connected to sheet 50 at equally spaced points throughout the length of the anode, this arrangement of posts 52 being indicated in FIG. 1. The purpose of the several posts is to minimize the inductance and impedance in the electrode discharge circuit and thereby reduce the rise time of the energy pulse.

Figure 4:
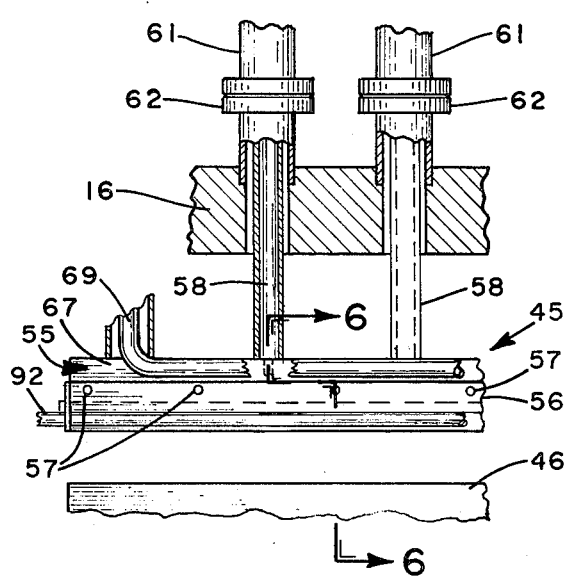
FIG. 4 is part of a transverse section taken on line 4—4 of FIG. 3.
Figure 6:
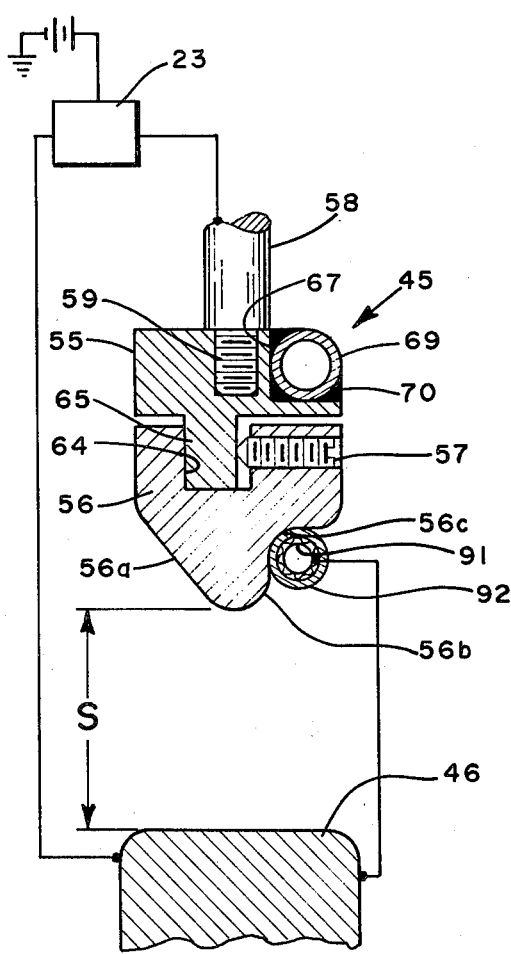
FIG. 6 is a greatly enlarged sectional view of the anode and cathode assemblies taken on line 6—6 of FIG. 4.

Cathode assembly 45 is coextensive with anode 46 and comprises a carrier bar 55, see FIGS. 4 and 6, and a cathode bar 56 secured by set screws 57 to carrier bar 55 adjacent to the anode. Carrier bar 55 is connected to the pulse forming network 23 by a plurality of rods 58 similar to those connected to the anode and for the same reason. Each rod 58 is secured to the carrier bar by a threaded connection 59. Rods 58 extend through and are sealed to housing top wall 16 by feedthrough tubes 61 which are similar to anode feedthrough tubes 53. These tubes make a vacuum-tight seal with the top wall and the electrical connection to the pulse forming network so as to maintain the high vacuum integrity of the interior of the laser housing. By way of example, the feedthrough tubes 53 and 61 may be made with Conflat flanges 62 manufactured by Varian Associates, Palo, Alto, California.

In order to insure that the spacing S between cathode bar 56 and anode 46 is constant throughout their length, cathode bar 56 is formed with a longitudinal groove or slot 64 and carrier bar 55 has a corresponding longitudinal tongue 65 projecting from its lower end into groove 64. Set screws 57 in cathode bar 56 are adapted to engage tongue 65 to lock the cathode bar securely to and to insure good electrical contact with carrier bar 55. With this arrangement, cathode bar 56 may be moved vertically relative to carrier bar 55 thereby enabling adjustment of the discharge gap spacing S as needed throughout the length of these electrodes to insure that the discharge gap is precisely uniform. In addition, cathode bar may be replaced readily in the event it becomes eroded from use. The width of groove 64 is slightly larger that that of tongue 65 to facilitate adjustment between these parts. Bars 55 and 56 preferably are made of copper or copper alloy.

Figure 5:
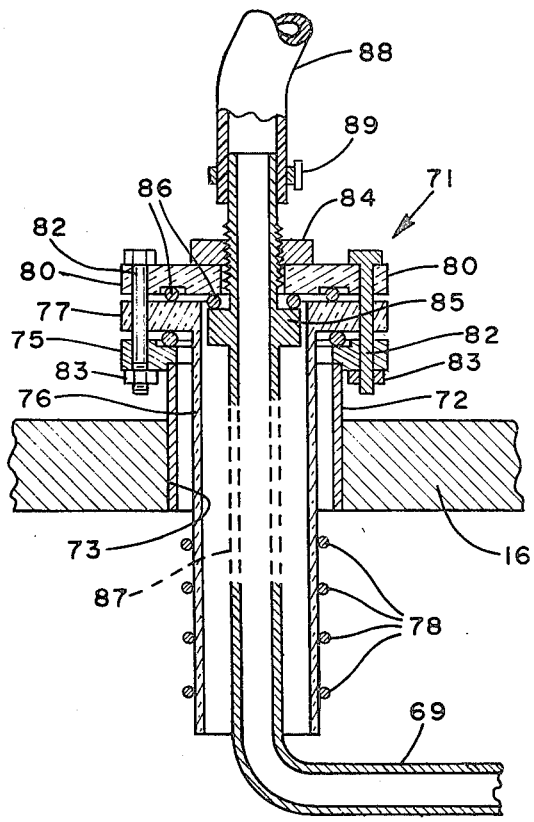
FIG. 5 is an enlarged cross section of the cooling water feedthrough assembly.

In the operation of the laser the electrical discharge between the cathode and anode causes the former to heat up primarily because of the bombardment on it of ions formed in the discharge. In order to cool the cathode assembly, carrier bar 55 is formed with a recess 67 and a cooling tube 69 is disposed in that recess throughout the length of the carrier bar. Tube 69 is brazed, as indicated at 70, into recess 67 to enhance heat transfer from carrier bar 55 to the tube and coolant flowing in the tube. Tube 69 preferably is made of copper or the like and at opposite ends of the cathode assembly extends upwardly through housing top wall 16 for connection to manifold assembly 25 by means of feedthrough assemblies, one of which is shown at 71 in FIG. 5. Each assembly 71 comprises a metallic outer tube 72 secured in opening 73 in the housing top wall and bolt ring 75 secured to the top of tube 72. A ceramic tube 76 having an upper flange 77 over ring 75 extends through and is spaced inwardly from outer tube 72 substantially below housing top wall 16 and electrically insulates cooling tube 69 from the metallic parts of the assembly including the housing. Dielectric rings 78 on the lower portion of tube 76 prevent arcing between the cooling tube and the housing top wall. A ceramic flange ring 80 is disposed on top of flange 77 of tube 76 and is secured to flange and ring 75 by dielectric bolts 82 and nuts 83. A lock nut 84 engages threads on cooling tube 69 and presses ring 80 against the shoulder of a collar 85 on cooling tube 69. O-rings 86 between mating parts of this assembly provide a vacuum-tight seal to insure high vacuum integrity of the laser housing.

In order to accommodate thermal expansion, contraction and mechanical tolerances, cooling tube is provided with bellows indicated by the broken lines at 87. The upper end of the tube is connected by a dielectric hose 88 to the manifold assembly 25. Hose 88 is secured to tube 69 by a clamp 89.

Figure 7:
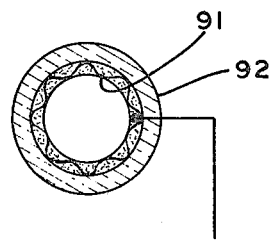
FIG. 7 is an enlarged view of the preionizer electrode of FIG. 6.

In order to preionize the laser discharge gap and facilitate the electrical breakdown of gas in the gap, a preionizer electrode 91, see FIGS. 6 and 7, is disposed adjacent to one side of cathode bar 56 throughout its length and is electrically connected to anode 46. Electrode 91 preferably comprises a braided conductive sleeve and is disposed within a dielectric tube 92 made of quartz or the like which engages the side of cathode bar 56. Sleeve 91 has a relaxed diameter equal to or slightly greater than the inside diameter of tube 92 so as to press uniformly against the interior of the tube. Since the wall thickness of tube 92 is uniform, the spacing between electrode 91 and cathode bar 56 is uniform throughout their respective lengths which insures uniform preionization of the discharge gap and efficient initiation of the main discharge against the gap. Sleeve 91 may be inserted into tube 92 with a reduced diameter caused by twisting or elongating of the sleeve and after insertion is expanded against the interior of tube 92 by the reverse procedure. Sleeve 91 is electrically connected to anode 46 by conductive strap 94, see FIG. 3, fastened to anode post 52.

Preionizer tube 92 and sleeve 91 may also be located adjacent to anode 46 with sleeve 91 electrically connected to cathode 45 as an alternate arrangement, if desired.

It will be noted that the lower extremity of cathode bar 56 has a transverse dimension less than the upper portion thereof with the side surfaces 56a and 56b diverging from the lower extremity to the upper portion. This shape of the cathode bar has been found to support an efficient flow of electrons across the discharge gap because of the proximity of the cathode tip and adjoining corona or preionizing tube to the anode. The field enhancements at the other edges of the cathode are therefore small compared to the enhancement at the cathode tip. In order to improve the efficiency of the preionizer electrode, the cathode side 56b is formed with a recess 56c having a cylindrically-shaped surface adapted to mate with the outer surface of dielectric tube 92. This cathode bar shape increases the surface area proximate to electrode 91 and insures efficient operation of the preionization system.

What is claimed is:

1. Laser electrodes for a gas discharge laser having a housing and power supply means comprising
   an elongated conductive bar constituting an anode supported on and within said housing,
   an elongated cathode coextensive with and parallel to and spaced from said anode and supported on and within said housing, the space between said anode and cathode constituting the laser discharge gap,
   means for connecting said power supply means across said anode and said cathode for producing an electric discharge in said gap,
   said cathode comprising:
   a carrier bar,
   a cathode bar mounted on said carrier bar between said anode and said carrier bar,
   means for adjusting the spacing between said cathode bar and said anode comprising:
   a longitudinal tongue on one of said bars,
   a longitudinal groove in the other of said bars adapted to receive said tongue,
   the depth of insertion of said tongue in said groove being variable and corresponding to the spacing between sad bars, and
   lock means on said one of said bars engageable with said tongue for releasably engaging the latter whereby to lock said bars together.

2. The electrodes according to claim 1 with a plurality of electrically conductive rods secured to said carrier bar at longitudinally spaced intervals, respectively, said rods being electrically connected to said power supply means.

3. The electrodes according to claim 1 with a preionizer adjacent to one of the laser electrodes throughout the effective length of the latter, said preionizer comprising an insulator tube engaging said one electrode bar and a conductor element within said tube, said element being electrically connected to the other laser electrode.

4. The electrodes according to claim 3 in which said one of said electrodes comprises the cathode.

5. The electrodes according to claim 4 in which said cathode bar has a lower extremity proximate to said anode with a transverse dimension less than the upper portion thereof and with side surfaces diverging from said lower extremity to said upper portion, one of said side surfaces having a recess with a cylindrically shaped surface, said side tube being disposed to engage said surface of said recess.

6. The electrodes according to claim 3 in which said conductor element is braided cylindrical sleeve engaging the interior of said tube throughout the lengths thereof, said sleeve when relaxed having a diameter greater than the internal diameter of said tube and when torsionally or longitudinally stressed having a diameter less than said internal tube diameter whereby to be insertable into said tube.

7. The electrodes according to claim 3 in which said cathode bar has a lower extremity proximate to said anode with a transverse dimension less than the upper portion thereof and with side surfaces diverging from said lower extremity to said upper portion.

* * * * *